Sept. 29, 1942.   F. A. HUHN ET AL   2,297,477
FLUID SEAL
Filed Aug. 3, 1940
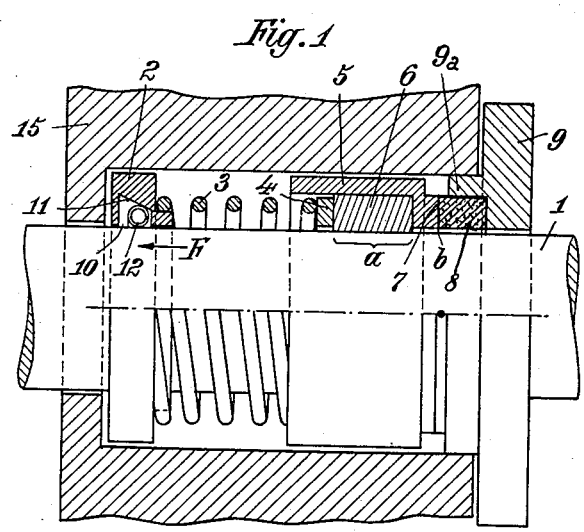
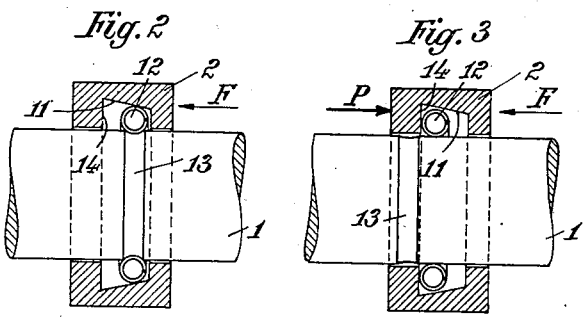
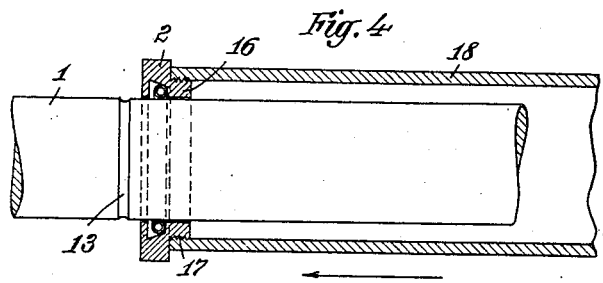
Inventors.
Felix Antonius Huhn,
Carl Kreemke.
By
Harness, Dickey & Pierce.
Attorneys.

Patented Sept. 29, 1942

2,297,477

UNITED STATES PATENT OFFICE 2,297,477

FLUID SEAL

Felix Antonius Huhn and Carl Kreemke, Berlin, Germany; vested in the Alien Property Custodian Application August 3, 1940, Serial No. 350,576
In Germany July 27, 1939

3 Claims. (Cl. 286—7)

The present invention relates to new and useful improvements in fluid seals and it pertains more particularly to a sliding ring packing for rotatable shafts of the type wherein a rotary element of the packing assembly is pressed by one or more spring members, also rotating with said rotary element, towards a stationary element of said packing assembly, said spring member or members being adapted to bear upon a collar supported by said shaft and rotating therewith.

Packing devices of this class have been heretofore constructed and used, but they were arranged in such way that the sealing occurs at an annular surface which is at right angles to the shaft axis and the sealing surfaces are in mutual sliding contact. The rotating element of the sliding packing assembly represents a socket member freely mounted on the rotary shaft and forming with the peripheral surface of the latter, a unilaterally open annular space. A soft packing is provided in said annular space, said packing being urged towards the end wall of the socket member by means of a pressure annulus under the influence of a simultaneously rotating spring or springs. By these means the packing is compressed so that it firmly embraces the rotating shaft. One end of the spring or springs is located in said socket and it rests on a pressure annulus adapted to compress the soft packing, whilst the other end of said spring or springs bears onto a collar member secured on the shaft and revolving therewith.

The primary object of the present invention is to provide means by which a fluid proof seal is obtained between sealing surfaces of which one, at least, is formed as a solid ring of graphite or graphite-carbon enclosed in a jacket of steel or the like and adapted to be ground to provide a dense and hard surface.

Another object of this invention is to secure a self-locking action of a collar supporting the end of a spring or springs remote from the other end seated against the pressure annulus.

Still another object is to provide a sliding-ring packing arrangement permitting very high rotary speeds without the danger of the co-operating surfaces of the packing assembly becoming frayed, but on the contrary, with a high self-lubricating effect.

Still a further object is to provide a sliding ring packing assembly for rotatable shafts which is simple and cheap in construction and operation and highly effective in use, as well as easy to handle.

With the above and other objects in view the present invention consists in the novel features of construction and in the arrangement and combination of parts to be hereinafter described and more particularly pointed out in the subjoined claims.

In carrying the invention into effect, the known sliding ring packing is improved in such way that at least one sliding ring packing element is formed as a solid graphite or graphite carbon ring enclosed in a jacket or mount made of steel or of a material having similar characteristics. Furthermore the collar taking the reacting force of the spring or springs urging the revolving element of the sliding ring packing assembly towards the stationary one is formed as a shiftable ring comprising self-locking means adapted to lock such collar ring in its position on the shaft under the action of spring pressure and in opposition thereto, whilst said ring may be easily shifted against such spring pressure.

The locking means are formed by a collar member having an inclined annular (frusto-conical) surface which diverges from the shaft in the direction of spring pressure. The said frustoconical surface embraces locking rolling members as balls (not shown) or an annular helically wound spring. By these means and owing to the friction occurring between the shaft and the locking members said conical surface brings about a wedging effect resulting in a locking of said collar on the shaft against axial movement in one direction.

The graphite or graphite carbon ring of the sliding packing enclosed in a steel jacket is effectively connected with said latter in such a way that the jacket formed of steel, or of a metal having similar characteristics, is shrunk hot on the said graphite or graphite carbon ring at such temperature that when a contraction occurs at cooling, such ring is considerably compressed. This is followed by the mass of said ring being put under considerable stress and at the same time being strongly compressed. The magnitude of the outer diameter of the graphite or graphite carbon ring and of the inner diameter of the steel jacket shrunk thereon as well as the heating of the latter prior to carrying out the shrinking operation, are selected so that in service conditions, also at the highest occurring temperatures to which the sliding ring packing may be exposed, said graphite or graphite carbon ring will have still a biasing stress. Owing to the compressed state of the ring, its radial sliding surface can be ground so that an absolutely flat, very compact and hard surface is obtained. The hardness of such surface can be subsequently increased by polishing it to such a degree that a highly glazed mirror-like surface results. Such a surface is extremely resistant to wear and it does not easily absorb impurities that are likely to contact therewith. Nevertheless it has the extremely important feature of being highly self-lubricating if the ring is formed of or comprises purest artificially produced graphite. Such packing needs no lubrication or any other attention during service. A fraying effect likely to occur at high rotary speeds on sliding surfaces when both of them are made of metal or the like is completely eliminated by the use of graphite or graphite carbon rings. Therefore it may be possible to increase the rotational speeds to a high degree without giving rise to the danger of the surfaces being frayed.

The stationary element of the sliding ring packing assembly is in the form of a graphite or graphite carbon ring. However there is no objection to making the revolving ring of graphite or graphite carbon, also. On the other hand satisfactory results before obtained when the revolving element is made of steel, preferably stainless, such as a special steel with a chromium content or a nitrided steel.

The packing contained in the freely mounted socket is preferably made of a soft packing material properly adjusted to the working medium, such for instance as cotton, asbestos, rubber or the like.

The collar ring used in this invention is constructed so, as to be on the one hand easily shiftable on the shaft in opposition to the pressure of the revolving spring or springs and on the other hand to be self-locked under spring pressure in the direction of such latter. Such arrangement has the great advantage of allowing for an easy positioning of the collar on any desired place on the shaft without the necessity of having special arrangements, such as clamping screws etc., used with the prior art collars for the purpose of securing same on the shaft. The arrangement according to this invention has the advantage of permitting, without difficulty, the adjusting of the pressure between the revolving sliding ring element and the stationary one by positioning the collar. In order to render possible a safe hold of the adjusted position of the collar ring and for the purpose of preventing a shifting of said collar in the direction of spring pressure under the action of spring means in consequence of the inevitable vibrations of the shaft, the shaft is provided with one or more shallow turned grooves wherein the self-locking annular helically wound springs are located. Such self-locking members are pressed into said grooves under the action of the above mentioned conical surface so that any undesired movement is prevented. A number of such shallow grooves may be arranged adjacent to one another so that the collar may be selectively positioned over that one of them corresponding to the pressure desired for the sliding ring packing assembly. Instead of providing grooves it may be sufficient in many cases to roughen a certain length of the shaft at the prospective places where the collar has to be positioned.

In the accompanying drawing forming a part of this specification a typical exemplary embodiment of the present invention is shown whereby like characters designate like parts throughout the drawing:

Fig. 1 represents diagrammatically a longitudinal sectional view of a sliding ring packing constructed in accordance with the present invention.

Figs. 2 and 3 illustrate diagrammatically the operation of the self-locking collars;

Fig. 4 shows a particular structural embodiment of the collar ring member with a tool employed for fitting purposes.

Referring more particularly to the drawing the reference character 1 designates a rotary shaft and 15 a part of any desired housing, between which it is desired to provide a fluid tight seal. A fluid tight joint is present between the housing 15 and a metal closure or jacket plate 9 which is described hereinafter in greater detail. A collar member 2 surrounds the shaft 1 and it is adapted to serve as abutment for a helical compression spring 3. This spring exerts a compressive force onto a pressure annulus 4 mounted loosely in a socket 5 surrounding and freely rotatable with respect to the shaft 1. Said socket 5 is L-shaped in longitudinal section. Inside the space formed by the socket 5 and the pressure annulus 4, a packing 6 is located which is made of a relatively yieldable packing material. Constant pressure is exerted by spring 3 and pressure annulus 4 against the said packing material 6 so that said packing is tightly compressed around the shaft 1 and forms a fluid tight seal on a certain length $a$. The end surface 7 of socket 5 is ground plane, and bears against a sliding ring 8 made of such material as polished graphite or graphite carbon. Thereby a further seal is provided at $b$ in a radial annular surface. The graphite or graphite carbon ring 8 is mounted in the metal jacket plate 9 in such way that said metal jacket, made of steel or the like, is shrunk hot onto the graphite or graphite carbon ring 8, so as forcibly to enclose said packing ring by an axially extending annular flange 9a integrally formed with said jacket plate 9.

The purpose of collar 2 is to take the pressure of spring 3 acting in the direction of the arrow F (Fig. 1). The collar 2 represents a ring of substantially U-shaped section. It has an annular groove 10 formed therein with an inner peripheral wall or surface 11 inclined towards the shaft axis in such a way that such inclined annular (frusto-conical) surface diverges in the direction of spring pressure. Within the groove 10 is housed a rolling member 12 representing in the contemplated exemplary embodiment, an annular helically wound spring. If the collar 2 is moved in opposition to the arrow F (in the direction of arrow P in Fig. 3), i. e., in opposition to the force exerted by spring 3, such movement encounters no obstacle, because of the rolling member 12 being subject to no locking effect in such event. However movement in the direction of the arrow F, i. e., in the direction of the pressure exerted by spring 3, is not possible, because of the rolling member 12 being then wedged between the peripheral surface of the shaft 1 and the frusto-conical surface 11.

The operation of the rolling member is clearly illustrated by Figs. 2 and 3.

Fig. 2 represents the shaft 1 having the collar 2 and a rolling member 12 freely mounted thereon. For the purpose of securing a firm seat it may be advisable to provide the shaft with a shallow groove 13 having a depth of approximately .10 mm., so that said shaft is substantially not weakened thereby. In the position represented on Fig. 2 the rolling member 12 is wedged between the peripheral surface (groove 13) and the conical surface 11. The greater the pressure acting in the direction of the arrow F, the stronger is the wedging effect.

If now collar 2 is moved as shown in Fig. 3 in opposition to arrow F, i. e., in the direction of arrow P, the wedging action between the frustoconical surface 11 and the peripheral surface 13 of the shaft ceases and said collar is firstly shifted up to the place where its radial wall 14 contacts with the rolling member 12. By applying a continued force in opposition to arrow F the rolling member may be forced out of the groove as represented in Fig. 3, so that the collar can be shifted by a desired amount in opposition to said arrow F. The use of turned-in grooves 13 is not absolutely necessary, however it is preferable in order to avoid changes in the adjustment of the collar due to eventual vibrations. In many instances it may be also satisfactory to have the peripheral surface of the shaft roughened in any known manner on the length where the collar has to be positioned. If the peripheral surface of the shaft is smooth, it is advisable to make the angle between such peripheral surface and the frustoconical surface 11 as small as possible, because of the wedging and self-locking effects being good in the proportion of such angle being small.

The fitting and removing of self-locking collar rings involves certain difficulties. Therefore it may be preferable to provide such collar rings with an axially directed extension having a screw thread thereon onto which a correspondingly threaded tool may be screwed. Fig. 4 represents a shaft 1 with its collar 2. This latter has an extension 16 provided with an outer screw thread 17. A tubular tool 18 having a corresponding inner thread may be screwed onto thread 17. The fitting of the collar 2 on shaft 1 is carried out in such way that first of all the tool 18 is screwed onto said collar. Thereafter said collar is forcibly shifted onto the shaft in opposition to the locking action of the rolling member located within the collar 2, until said rolling member snaps into the groove 13. The tool 18 may be also used for the purpose of removing the collar from the shaft. In this latter case a movement in opposition to arrow F is necessary because of a self-locking effect of said collar occurring in the direction of the arrow only.

From the foregoing it will be seen that the present invention provides a sliding ring packing assembly in which a fluid proof seal is obtained and which may be readily adjusted to any desired pressure between the stationary and revolving elements of the packing assembly, which is accomplished by easily shifting a spring-supporting self-locking collar member mounted on a rotary shaft and revolving therewith to adjust the spring pressure urging both elements of the packing assembly towards one another. One at least of the sliding ring packing elements is formed of such material and is so forcibly enclosed in a resistant supporting jacket member that very high rotary speeds may be permitted without the danger of the co-operating surfaces being damaged, but on the contrary such surfaces co-operating under a high self-lubricating effect. It may be also seen that the present invention provides a simple and effective structure of the class described which is economic to manufacture and also easy and inexpensive to use.

What we claim is:

1. A sliding ring packing assembly adapted to provide a fluid-tight seal comprising, in combination, a stationary housing member, a shaft member rotatable in said housing member, a jacket closure member having a fluid-tight joint with said stationary housing member, a stationary sealing member surrounding said shaft and secured to said jacket closure member, said sealing member having a radial end bearing surface, a rotary sealing member surrounding said shaft and having a radial end bearing surface in sealing engagement with said stationary sealing member bearing surface, said rotary sealing member being shaped to provide an annular recess surrounding the shaft and adapted to receive packing material, packing material in said annular recess, an annular pressure ring slideable in said recess for bearing on said packing, a collar surrounding said shaft, said collar having an inner frusto-conical bearing surface, a helical compression spring bearing between said collar and said pressure ring for compressing said packing, and a helical spring formed as an annulus disposed between said shaft and said frusto-conical bearing surface for wedgingly securing said collar to said shaft when said collar is urged in the direction of compression spring pressure and permitting said collar to move freely when urged in opposition to such spring pressure.

2. A structure as defined in claim 1, in which the shaft is provided with a shallow groove in its peripheral surface for receiving the helical spring annulus.

3. A sliding ring packing assembly adapted to provide a fluid-tight seal comprising, in combination, a stationary housing member, a shaft member rotatable in said housing member, a jacket closure member having a fluid-tight joint with said stationary housing member, a stationary sealing member surrounding said shaft and secured to said jacket closure member, said sealing member having a radial end bearing surface, a rotary sealing member surrounding said shaft and having a radial end bearing surface in sealing engagement with said stationary sealing member bearing surface, said rotary sealing member being shaped to provide an annular recess surrounding the shaft and adapted to receive packing material, packing material in said annular recess, an annular pressure ring slidable in said recess for bearing on said packing, a collar surrounding said shaft, a helical compression spring bearing between said collar and said pressure ring for compressing said packing, and self-locking rolling means wedging between said collar and said shaft for securing said collar to said shaft when said collar is urged in the direction of compression spring pressure and permitting said collar to move freely when urged in opposition to such spring pressure, said shaft being provided with a shallow groove in its peripheral surface for receiving the self-locking rolling means.

FELIX ANTONIUS HUHN.
CARL KREEMKE.